March 18, 1947.                P. RUBIN                2,417,449
            TIRE INFLATION INDICATOR VALVE CAP
                    Filed March 21, 1945
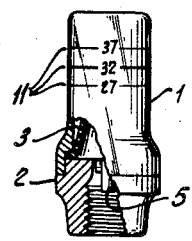
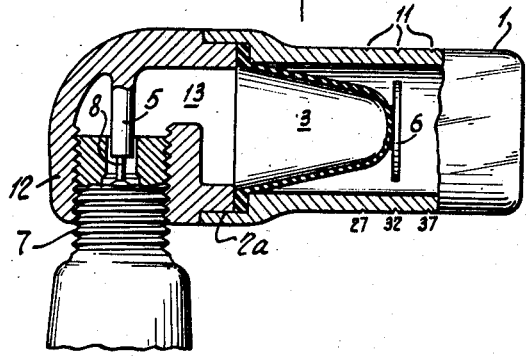
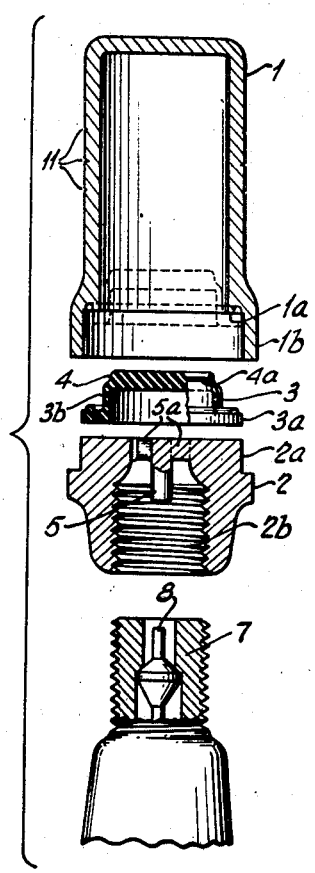
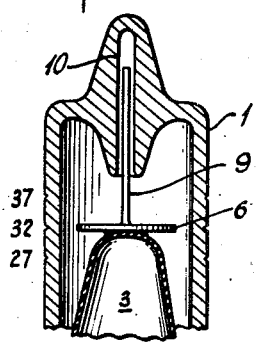
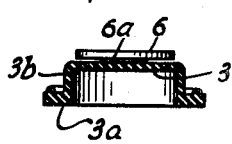
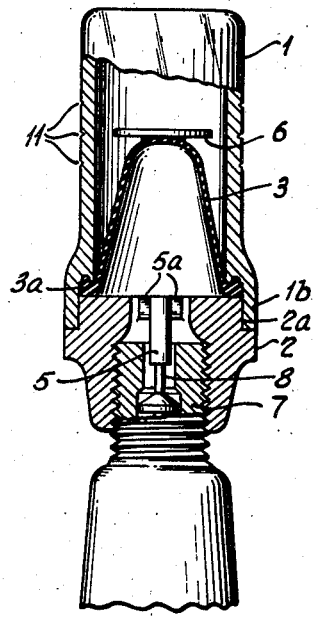
INVENTOR.
Paul Rubin.
BY
ATTORNEY.

Patented Mar. 18, 1947

2,417,449

UNITED STATES PATENT OFFICE 2,417,449

TIRE INFLATION INDICATOR VALVE CAP

Paul Rubin, Shamokin, Pa.

Application March 21, 1945, Serial No. 584,005

1 Claim. (Cl. 73—390)

The invention relates to indicators of air pressure, and more particularly devices for readily indicating slight variations in the pressure of air from a predetermined degree. In the preferred forms it is intended to serve as a quick reading device to check at a glance the air pressure in pneumatic tires.

The objects are to provide such a device in most simple and durable form, and capable of economical and accurate production with materials that simplify manufacture and are capable of fabrication with accuracy.

One object in particular is to avoid any parts movable in contact or requiring packing or lubrication, and thus to avoid the use of materials that deteriorate or corrode and prevent permanent accuracy in the functioning of the device.

While certain features of the invention may be used in providing such pressure indicators of varying sizes, and suitable for quick application to an air pressure vent, my preferred form is a device adapted to be fastened to the valve stem of a pneumatic tire, and to remain permanently attached, so that the safe pressure condition of each tire can be observed at a glance without the necessity of removing a valve cap or adjusting the ordinary pressure gauge to each of the tire valve stems.

In such preferred form the device consists of only three parts; a small chamber of transparent thin walls closed at one end, a cap at the other end with means for attachment to a valve stem, and between the two a distendable diaphragm. These three parts are assembled holding the diaphragm periphery clamped between the abutting parts of the air chamber and the cap or base. This provides a sealed chamber, so that with admission of air pressure from the tire, the diaphragm is distended and compresses the small volume of air in the closed end of the chamber until such slightly compressed air balances the pressure responsive to the pressure of air in the tire. With such balanced pressure the position of the center of the distended diaphragm becomes the position relative to the walls of the chamber indicating the desired normal pressure of air in the tire. The position may be marked on the transparent walls of the chamber, preferably circular distinct markings on the outside of the transparent walls, and two additional graduations to respectively indicate an increased pressure or a decreased pressure so as to readily show the necessity of inflation of the tire or release of pressure to bring it to the desired normal degree for proper operation.

It will be noted that the balance of pressure in the closed chamber which determines the position of the distended center of the diaphragm involves no engagement of moving parts, no sliding or friction and no necessity of a packing or gland, all of which objectionable features have heretofore militated against the accuracy or permanent functioning or reliability of devices in this general class.

While I prefer to attach my simple indicator, when used on all tires in a motor car, by screwing the same directly on to the threads of a valve stem axially of the air pressure chamber, I may vary the attaching means or the form of the base to suit the conditions of valve position. For example, a side valve lends itself to a modified device in which the indicating chamber is at an angle or directly at right angles to the axis of the valve stem, in which case the base or attaching cap is modified as shown in the drawings and hereinafter described, and in this way keeps the indicator from projecting beyond the tire or rim where it will be liable to injury, or in a position most readily observable. It will be noted that all parts of my device may be made by the simple operation of molding. I prefer to mold the indicator chamber of plastic material with the observation portion of the walls cylindrical and thin, so that their parallel surfaces assure no deflection of vision, thus assuring accuracy in noting at a glance the registration of the distended diaphragm center or cap with the calibrations on the chamber. The base likewise I prefer to mold in plastic. Both these parts are therefore of the simplest form and are most economically produced. Likewise the engaging parts of such material may be readily and securely cemented together by adhesive easily applied and permanent, though in some forms may be screwed together. The diaphragm can also be dipped or molded or vulcanized in a manner to assure uniformity of stretch so that the distention will register with the predetermined observation calibration in all devices made in large quantities.

In the accompanying drawings particular embodiments of my invention are shown in which Figure I is a full size elevation, part sectional, of an indicator in a form adapted to be screwed axially on to a valve stem.

Figure II is a modified form, double scale, in which the indicating portion of the device projects laterally from the portion screwed on to the valve stem parts in section.

Figure III is an exploded showing of the different elements, double scale, of the device in Fig. I;

in which the indicator chamber in section is separated from the diaphragm shown partly in section and the base in section, and the adjacent fragmentary portion of a standard valve stem to which the device is attached airtight.

Figure IV is a longitudinal section, double scale, of the indicator cap of Fig. 1 as attached to the end of a valve stem with tire valve pressure distending the diaphragm and its indicating end into the air tight end of the indicator chamber.

Figure V is a section of a diaphragm, double scale, with modification.

Figure VI is a modified form, double scale, of the air tight end of an indicator chamber with a modified form of diaphragm end guiding means parts in section.

In all figures 1 is the indicator chamber, 2 is a base with threaded means for screwing on to a standard valve stem 7. 1a is a shoulder, preferably with a recess, around the open end of chamber 1 and inside the flange 1b which has a tight sliding fit over the end 2a of the base. The diaphragm has a peripheral edge, preferably beaded or enlarged at the extremity, adapted to quickly register upon the assembly of parts with the recess 1a, so that the base pressed into the open end of the chamber 1 will force the periphery of the circular diaphragm 3 into an air tight fit, and by cementing the base with its substantial surface contact with the open end of the chamber, the three parts are permanently secured with the diaphragm hermetically sealed at the open end of chamber 1, but subject to air pressure coming through the valve stem, so that the pressure at any time distends the diaphragm into and toward the closed end of the chamber 1. The extent of such distension depends upon the air pressure released from the tire valve, but in the movement of the diaphragm the air in the closed end of the chamber 1 is compressed until the pressure therein is balanced against the pressure of the air from the tire.

Upon the application of the indicator to the valve stem, the pintle 5 in the base 2 projects sufficiently to impinge on the pin 8 of the valve in the valve stem, and with the engagement of the threaded portion of the base 2b the valve is opened and permits the free movement of air through openings 5a adjacent the pintle 5 and therefore exerting pressure directly on the diaphragm. In one form the diaphragm may have a thickened central portion 4 cemented or vulcanized with the diaphragm, leaving walls 3b of the diaphragm relatively thin and therefore readily stretchable to permit the desired distension of the cap of the diaphragm. On such heavied central portion I may have a distinct mark as 4a, or it may be a circumferential line of luminous material for reading in the dark in order to have a suitably accurate indication visible through the transparent wall of chamber 1 to see at a glance the registration of diaphragm distension with predetermined circular markings 11 on the substantially parallel walls of a portion of chamber 1, thus determining the indication of optimum or greater or lesser inflation of the tire.

In the modification of Fig. IV, the diaphragm may have a rigid, such as a metal disc 6, partially cemented at its center 6a to the end of the diaphragm 3. Another form is shown distended in Fig. VI where the disc may have attached an axial pin 9 which projects into a recess 10 in an elongated air tight end of the modified form of chamber 1. Such parts 6 and guide pin 9 may be molded of plastic and the disc 6 variously formed and with distinct reading mark 4a in or on it.

Figure IV shows, in the double scale, the parts of Fig. III assembled and screwed onto the valve stem, all in section, which illustrates the effect of the opening of the tire valve and distension of the diaphragm until the balance of pressure in the closed air tight end of chamber 1 with the tire pressure brings the central part of the diaphragm into a balanced position registering for pressure reading with the fixed markings 11 on the wall of the chamber 1.

In Fig. II the base adapted to be screwed onto the valve stem is a modified form 12 in which the pintle 5 is formed in the overreaching adjacent wall of the base 12 and the annular recess 2a is formed on one side of the axis of the threads 7 so that the indicating chamber 1 is slipped on to the base from one side and grips and hermetically holds the diaphragm in the same manner, while the tire air pressure is exerted through the passage 13 to the under or open side of the diaphragm.

It will thus be seen that my tire inflation indicator valve cap in one particular form is suitable for attachment with the same calibrations, such as a normal 32 lbs. pressure and over or under pressure graduations to the vast majority of tires in actual use. Different sizes and different graduations can be provided for the small proportion of other sizes of tires that require a different optimum air pressure for best and most durable operation. In some sizes or forms I may have a series of graduations and an adjustable narrow band encircling the chamber that can be set to show the optimum pressure desired for the particular use of the device, thus making one size of more universal use. Colored material may be used embedded in the plastic for clear reading of graduations or fashioned on the plastic parts for size designation, type, or other identification.

The diaphragm above described is preferably a circular thin rubber with a thicker peripheral bead, so as to readily seat itself in the shoulder at the open end of the indicator chamber and be there evenly pressed on the base. The base is cemented at its circumference to the sleeve at the open end of the chamber, thus holding the elastic member permanently and hermetically sealed, and providing one operation to an assembled unit, rigid and without any parts requiring adjustment, inspection or removal.

While I may vary the dimensions of the diaphragm my experiments have shown that very thin rubber, seasoned for years, with a thin metal disc attached to its center has a regular variation of stretch in proportion to the air pressure that provides movement suitable for distinct reading at a glance through the transparent wall of the closed air chamber. I may however provide, as shown in Fig. VI, a guide pin projecting from the center of the diaphragm, or from the plate attached to it, and entering an axial cavity in the end of the closed air chamber so that the registering plate or end of the diaphragm is always maintained in a position normal to the transparent walls of the chamber throughout the range of pressure in the chamber affected by the diaphragm distension and up to the balance of pressure necessary for the desired function of any indicator.

While many variations may be made from the particular form or modifications here shown and described, I do not confine myself to such.

What I claim and desire to obtain by Letters Patent is:

A permanent pressure indicator for tire inflation comprising a transparent wall elongated chamber closed at one end, a base therefor adapted for attachment to a valve stem, a stretchable diaphragm having a peripheral edge hermetically held between the base and adjacent open end of the chamber, permitting said diaphragm to distend into the chamber with varying air pressure, a central cap on said diaphragm adapted to move freely in said chamber subject only to varying air pressure on said diaphragm, and optimum calibrations on wall portions of said chamber whereby through said transparent wall of the chamber the extent of distension of the said diaphragm is constantly visible and with respect to registration with said calibrations to indicate at a glance variations of air pressure of the tire.

PAUL RUBIN.

REFERENCES CITED

The following references are of record in the file of this patent:

UNITED STATES PATENTS

| Number | Name | Date |
| --- | --- | --- |
| 1,490,036 | Sheppard | Apr. 8, 1924 |
| 1,472,712 | Altz et al. | Oct. 31, 1923 |
| 1,388,443 | Stewart et al. | Aug. 23, 1921 |
| 1,606,674 | Sutherland | Nov. 9, 1926 |
| 2,225,674 | West | Dec. 24, 1940 |
| 2,225,675 | West | Dec. 24, 1940 |